United States Patent [19]

Young

[11] 4,142,912
[45] Mar. 6, 1979

[54] LANDFILL MATERIAL

[75] Inventor: Dean A. Young, Yorba Linda, Calif.

[73] Assignee: Union Oil Company of California, Los Angeles, Calif.

[21] Appl. No.: 924,897

[22] Filed: Jul. 17, 1978

Related U.S. Application Data

[63] Continuation-in-part of Ser. No. 818,305, Jul. 25, 1977, abandoned.

[51] Int. Cl.$^2$ ............................................. C04B 31/02
[52] U.S. Cl. ...................................... 106/98; 405/129; 106/97; 106/288 B; 210/42 R; 210/59
[58] Field of Search ................. 106/89, 97, 98, 288 B; 61/35; 210/42 R, 59

[56] References Cited

U.S. PATENT DOCUMENTS

| 254,530 | 3/1882 | Budlong | 106/98 |
|---|---|---|---|
| 954,692 | 4/1910 | Phillips | 106/98 |
| 1,875,897 | 9/1932 | Stalhane | 106/89 |
| 3,980,558 | 9/1976 | Thompson | 210/59 |
| 4,046,674 | 9/1977 | Young | 208/251 H |

*Primary Examiner*—Helen McCarthy
*Attorney, Agent, or Firm*—Richard C. Hartman; Lannas S. Henderson; Gregory F. Wirzbicki

[57] ABSTRACT

A method for treating arsenic-containing waste materials for disposal in landfill sites comprises admixing an arsenic waste, Portland cement, sand, one or more water-soluble manganese or alkaline earth metal salts, and water, thereby producing a slurry similar to wet concrete, which slurry, when cured, leaves a rock-like material containing entrapped arsenic. This material may be used for landfill without danger of ground or rain waters leaching arsenic therefrom.

17 Claims, No Drawings

LANDFILL MATERIAL

CROSS-REFERENCE TO RELATED APPLICATIONS

This is a continuation-in-part of copending application Ser. No. 818,305 filed July 25, 1977, now abandoned.

BACKGROUND OF THE INVENTION

This invention relates to the disposal of arsenic-containing wastes. More specifically, it relates to a method for treating arsenic-containing waste materials so that they are rendered suitable for sanitary landfills.

Waste materials containing high concentrations of arsenic and/or arsenic compounds are obtained in certain commercial processes. One such is in the smelting of nickel-containing ores to obtain nickel metal. These ores often contain arsenic oxides as well as nickel constituents so that a byproduct containing arsenic is produced along with the nickel metal. Similarly, shale oil produced from any oil shales contains high concentrations of arsenic. These shale oils are virtually unsaleable until the arsenic is removed, such as by the process described in my U.S. Pat. No. 4,046,674 or by methods as shown, for example, in U.S. Pat. Nos. 3,804,750 and 3,933,624. In all such processes, however, a problem is ultimately encountered in disposing of the arsenic-containing byproduct.

At the present time arsenic wastes are usually stored, much like radioactive wastes, in holding areas designed to prevent the release of the arsenic into the ground. Some of the arsenic is marketable, primarily to steel producers, but the proportion thus sold is relatively small. Hence, the amount of arsenic held in holding areas is continually increasing, primarily because no satisfactory means are available for rendering it innocuous for use as a landfill.

SUMMARY OF THE INVENTION

According to the present invention, arsenic-containing wastes are mixed in water with (1) a suitable setting agent, such as Portland cement combined with sand and (2) one or more additive water-soluble manganese and alkaline earth metal compounds, said compounds being soluble in water at 25° C at least to the extent of 100 grams per liter. The proportions of water, additive metal compound, Portland cement, and sand are sufficient to produce a material having a consistency similar to that of wet concrete, which, when cured under conditions sufficient to cause solidification, such as by allowing the mixture to stand undisturbed for an extended period of time, usually about 1 to 2 days, yields a concrete or rock-like substance essentially completely impervious to the arsenic-leaching effects of ground or rain waters.

In simplified form, this invention involves adding an arsenic waste and one or more water-soluble manganese or alkaline earth metal compounds to a mixture otherwise comprising wet concrete. When cured, a solid material is produced similar to concrete but having the additional property of resisting the arsenic-leaching effects of ground or rain water.

As used herein, the terms "arsenic" and "arsenic components" are used interchangeably and are intended to include arsenic in whatever form, elemental or combined, it may be present. Also, all weight-percent proportions of arsenic or arsenic components, unless otherwise specified, are calculated as elemental arsenic.

DETAILED DESCRIPTION OF THE INVENTION

In the practice of this invention, waste materials containing arsenic are treated so that they may be used as a landfill. The invention is particularly designed for treating solid wastes containing at least 1 wt.% arsenic components or concentrated slurries containing at least 10%, usually 10–20%, by weight of solids containing at least 1 wt.% arsenic components. The invention is particularly designed for treating solid waste materials containing large proportions of arsenic, i.e., at least 20 wt.%, usually between 20 and 50 wt.% of arsenic components.

According to the invention a solid waste, preferably crushed to particulate form, or a slurry waste, preferably containing solids in particulate form, is admixed with a setting agent, such as a mixture of Portland cement and sand, in ratios ranging as follows:

TABLE I

| | Wt. % of Admixed Components | | |
|---|---|---|---|
| | Waste Solids[1] | Cement | Sand |
| Preferred Range | 2 – 15 | 30 – 60 | 40 – 75 |
| Practical Range | 0.1 – 25 | 20 – 70 | 35 – 85 |

[1]For waste slurries, the amount of waste solids includes dissolved solids.

Any of several commercial Portland cements may be used for purposes herein. In general, such cements will have a composition as shown in the following Table II:

TABLE II

| Weight-Percent Of Components In Portland Cement, Measured As Oxides | | | |
|---|---|---|---|
| $SiO_2$ | 5 – 27 | CaO | 30 – 70 |
| $Al_2O_3$ | 4 – 40 | MgO | 1.0 – 3.0 |
| $Fe_2O_3$ | 0.5 – 15 | $SO_3$ | 0 – 2.5 |
| Combustibles | 0 – 3 | Undeterminable | 0 – 5 |

Also admixed with the arsenic-containing wastes, Portland cement, and sand is sufficient of one or more highly water soluble (i.e., at least 100 grams per liter at 25° C.) manganese or alkaline earth compounds, as a solid or in aqueous solution, to provide a mole-ratio of total added alkaline earth metal and manganese to arsenic of between about 1 and 10, preferably 2 and 5, in the final mixture. Sufficient water is then added, if necessary, and thoroughly admixed to dissolve the additive and produce a material having a consistency similar to wet concrete, which material may be poured into molds and the like. Following curing of this material, a rock-like or concrete-like landfill material containing entrapped or encapsulated arsenic is obtained.

Landfill material made by the method above described is substantially inert and insoluble in ground or rain water. It is also substantially impervious to the leaching effects of such waters, which will leach out no more arsenic from said landfill material than from the surrounding soils. As a result, no contamination of underground waters or neighboring streams with pollutive or toxic amounts of arsenic is produced when leachates from landfill sites containing landfill material prepared in accordance with the invention are commingled with such underground waters or streams. (As used in the art, the term "leachate" refers to the liquid produced when rain or ground waters contact the landfill site, as by percolating or permeating through said landfill site.)

What leaching effects ground and rain waters do have on the landfill material of the invention may be substantially reduced by preparing it in large aggregates. The larger the volume to surface area ratio of the aggregate the lower will be the concentration of arsenic leached therefrom by ground or rain waters. Aggregates having volume to surface ratios above 1 ft$^3$:10 ft$^2$ and of volume of at least 0.1 ft$^3$ are preferred.

The following Examples demonstrate the performance of landfill materials of the invention when subjected to strong leachants under conditions abnormally favoring arsenic leaching.

EXAMPLE I

A catalytic absorbent used to absorb arsenic from shale oil in accordance with the method shown in may U.S. Pat. No. 4,046,674 contained 26.8 wt.% arsenic. It was ground to 60 mesh and mixed with dry components in the following weight proportions: 5 parts ground absorbent, 100 parts Portland cement, and 140 parts 100/30 mesh sand. The mixture was divided into 16 portions, to 15 of which various additives as shown in Table III were introduced, three of said additives being in solid form and the remainder as aqueous solutions. To the three mixtures containing solid additives and the one mixture containing no additive sufficient water was added to make a material having a consistency similar to the mixtures containing liquid additives. All mixtures were poured into a mold for making ½-inch diameter by 3/16-inch thick wafers. All of the mixtures hardened into rock-like substances.

A leaching solution comprising water containing 3400 ppmw NaHCO$_3$, 10,700 ppmw Na$_2$SO$_4$, and 1300 ppmw NaCl, which solution was representative of drainage water obtained by retorting oil shale, was prepared. It was added to each of the wafers held in a suitable vessel in an amount such that for each gram of arsenic in the wafers, 20 liters of solution would be in contact therewith. The vessels were heated to 140° F for one day, and then allowed to stand at room temperature for eight days thereafter. The data shown in Table III show the concentration of arsenic in the leaching solutions, based on samples taken on the third, fourth, sixth, and eighth day of the experiment.

MgSO$_4$) or soluble manganese compounds retained substantially more arsenic than the wafer made with no additive. Of the remainder, only that wafer prepared with calcium hydroxide showed much higher retention for arsenic than the wafer made with no additive. However when the data obtained from the wafers made from calcium hydroxide and calcium chloride are compared, the water-soluble calcium chloride proves to be the superior additive.

Although the concentration of arsenic in all the leaching solutions is above that tolerated by most environmental regulations, it must again be emphasized that the data in Table III were obtained from an experiment conducted under conditions highly favorable for leaching arsenic. The extremely small volume (0.0368 in$^3$) of the wafers favors arsenic leaching, as does the use of both a solution highly concentrated in salts and a high temperature, the latter being used on the first day of the experiment. The data do show, however, the relative tendency of the various compositions to retain arsenic. Hence, when large aggregates of the landfill material prepared as described herein are contacted with low salt-containing ground or rain waters under ambient conditions, essentially no arsenic will be leached therefrom into the surrounding soils.

EXAMPLE II

A second experiment was performed wherein arsenic oxide-containing aggregates were produced and compared for arsenic-retaining properties when exposed to a severe leachant. The procedure used was as follows: A 2:1 mixture of 30 mesh sand and Portland cement was mixed with As$_2$O$_3$ powder. The mixture was divided into five samples, four of which were then admixed with a magnesium or zinc additive shown in Table IV in the proportion shown therein. After water was added to the mixtures in the proportions shown in Table IV, the mixtures, containing 4.0 wt.% of As$_2$O$_3$ as the oxide, were stirred to form thick pastes, which were then cast into 0.123 inch diameter × 0.060 inch thick wafers. The wafers were then cured in water-saturated air for three days at 140° F.

The cured wafers were soaked in a one kilogram aqueous 10% NaHCO$_3$ solution (pH 7.8) at 140° F. for 6 days. Liquid samples withdrawn at 3 day intervals were analyzed for dissolved arsenic, and the results so obtained are tabulated in Table IV.

TABLE III

| ADDITIVE | | LEACHING SOLUTION | | | |
|---|---|---|---|---|---|
| Material | Mol Ratio of Additive Metal to As | Days | ppmw As | Days | ppmw As |
| None | — | 4 | 4.7 | 6 | 5.3 |
| 1.0 M CaCl$_2$ | 2.8 | 4 | 2.6 | 6 | 3.3 |
| 2.0 M CaCl$_2$ | 6.1 | 3 | 1.6 | 8 | 1.7 |
| CaSO$_4$ (powder) | 9.0 | 3 | 5.8 | 8 | 5.8 |
| Ca(OH)$_2$ (powder) | 9.0 | 3 | 3.4 | 8 | 3.0 |
| 1.0 M MgCl$_2$ | 2.8 | 4 | 2.9 | 6 | 3.3 |
| 2.0 M MgCl$_2$ | 6.5 | 3 | 2.9 | 8 | 2.4 |
| 1.0 M MgSO$_4$ | 2.8 | 4 | 2.9 | 6 | 3.2 |
| 2.0 M MgSO$_4$ | 6.7 | 3 | 3.3 | 8 | 3.4 |
| MgO (powder) | 9.0 | 3 | 4.9 | 8 | 5.5 |
| 2.0 M Fe(NO$_3$)$_3$ | 14.4 | 3 | 6.2 | 8 | 5.8 |
| 0.5 M FeSO$_4$ | 1.8 | 3 | 13 | 8 | 12 |
| 1.0 M Al$_2$(SO$_4$)$_3$ | 8.0 | 3 | 9.3 | 8 | 10 |
| 1.0 M MnCl$_2$ | 2.8 | 4 | 3.6 | 6 | 3.2 |
| 6.5% SiO$_2$, Na$_2$SiO$_3$ | 4.8 | 4 | 8.8 | 6 | 11 |
| 6.1% SiO$_2$, Ludox | 4.4 | 4 | 6.9 | 6 | 7.2 |

As shown, the wafers made with soluble alkaline earth metal compounds (i.e., CaCl$_2$, MgCl$_2$, and

TABLE IV

| Sample No. | 1 | 2 | 3 | 4 | 5 |
|---|---|---|---|---|---|
| Additive | None | MgO | ZnO | Magnesium Acetate | Zinc Acetate |
| Wt. Additive: Wt. Cement | 0 | 0.044 | 0.044 | 0.155 | 0.098 |
| Wt. Water: Wt. Cement | 0.27 | 0.26 | 0.22 | 0.23 | 0.32 |
| Wt. Wafer per kg. of solution | 0.0080 | 0.0080 | 0.0083 | 0.0088 | 0.0073 |
| ppmw conc. of As in Soln. | | | | | |
| After 3 days | 219 | 211 | 222 | 62 | 192 |
| After 6 days | 220 | 214 | 219 | 59 | 145 |
| Theoretical Max. ppppmw As leachable | 213 | 217 | 233 | 222 | 200 |

The data in Table IV clearly show the superiority of a soluble magnesium component for retarding the leaching of arsenic from the aggregates.

Although the invention has been described in conjunction with specific examples thereof, it is evident that many alterations, modifications, and variations will be apparent to those skilled in the art in light of the foregoing description. Accordingly, it is intended to embrace all such alternatives, modifications, and variations that fall within the spirit and scope of the appended claims.

I claim:

1. A process for treating an arsenic-containing waste to produce an arsenic-containing landfill material essentially completely impervious to the arsenic-leaching effects of ground or rain waters, which process comprises:
   (a) admixing said arsenic-containing waste with (1) sufficient of one or more additive components selected from the group consisting of those alkaline earth metal and manganese compounds soluble in water at 25° C. to the extent of at least 100 grams per liter such that said one or more additive components are present in a total mole ratio to arsenic of between about 1 and 10, calculated as the total moles of alkaline earth and manganese metals in said one or more additive components to the total moles of arsenic in said arsenic-containing waste and (2) a setting agent comprising Portland cement and sand, said admixing being accomplished in the presence of sufficient water and with sufficient of said setting agent to produce a mixed material having the consistency of wet concrete;
   (b) curing the mixed material under conditions sufficient to cause solidification; and
   (c) recovering a rock-like aggregate essentially completely impervious to the leaching of arsenic therefrom by ground or rain waters.

2. A process as defined in claim 1 wherein said additive components are selected from the group consisting of calcium chloride, magnesium chloride, manganese chloride, magnesium sulfate, and magnesium acetate.

3. A process as defined in claim 1 wherein said arsenic-containing waste contains at least one weight percent arsenic components.

4. A process as defined in claim 3 wherein the aggregate recovered in step (c) has a volume to surface ratio above 1 ft$^3$:10 ft$^2$ and a volume of at least 0.1 ft$^3$.

5. A process as defined in claim 1 wherein said arsenic waste is a catalytic absorbent containing arsenic removed from shale oil.

6. A landfill material comprising a rock-like aggregate obtained by curing under conditions sufficient to cause solidification a mixture consisting essentially of an arsenic-containing waste, a setting agent comprising Portland cement and sand, water, and one or more additive components selected from the group consisting of those manganese and alkaline earth metal compounds soluble in water at 25° C. to the extent of at least 100 grams per liter, said landfill material being substantially more impervious to the arsenic-leaching effects of ground or rain waters than if said one or more additive components had not been present in said mixture.

7. A landfill material as defined in claim 6 wherein said additive components are selected from the class consisting of calcium chloride, magnesium chloride, manganese chloride, magnesium sulfate, and magnesium acetate.

8. A landfill material as defined in claim 6 wherein said arsenic-containing waste contains at least one weight percent arsenic components.

9. A landfill material as defined in claim 8 wherein the landfill material is in the form of an aggregate having a volume to surface ratio above 1 ft$^3$:10 ft$^2$ and a volume of at least 0.1 ft$^3$.

10. A landfill material as defined in claim 9 wherein said mixture contains sufficient of said one or more additive components such that said alkaline earth metal and manganese compounds are present in a total mole ratio to arsenic components, calculated as the total moles of alkaline earth and manganese metals in said additive components to the total moles of arsenic in said arsenic components, of between about 1 and 10.

11. A landfill material as defined in claim 10 wherein said arsenic waste is a catalytic absorbent containing arsenic removed from shale oil.

12. A process for treating an arsenic-containing waste to produce an arsenic-containing landfill material essentially impervious to the arsenic-leaching effects of ground or rain waters, which process comprises:
   (a) admixing said arsenic-containing waste with a setting agent comprising Portland cement and sand such that the resulting composition contains between about 0.1 and 25 wt.% of said arsenic-containing waste, between about 20 and 70 wt.% of Portland cement, and between about 35 and 85 wt.% of sand, and further admixing said resulting composition with (1) one or more additive components selected from the group consisting of those alkaline earth metal and manganese compounds soluble in water at 25° C. to the extent of at least 100 grams per liter and (2) sufficient water to dissolve said one or more additive components and produce a mixed material having the consistency of wet concrete;
   (b) curing the mixed materials under conditions sufficient to cause solidification; and
   (c) recovering a rock-like aggregate substantially more impervious to the leaching effects of arsenic therefrom by ground or rain waters than if said one or more additive components had not been present.

13. A process as defined in claim 12 wherein said resulting composition contains between about 2 and 15 wt.% of arsenic-containing waste, between about 30 and 60 wt.% of said Portland cement, and between about 40 and 75 wt.% of sand.

14. A process as defined in claim 13 wherein said additive components are selected from the group consisting of calcium chloride, magnesium chloride, manganese chloride, magnesium sulfate, and magnesium acetate.

15. A rock-like landfill material produced by curing under conditions sufficient to cause solidification a mixture comprising (1) an admixture comprising between about 0.1 and 25 wt.% of an arsenic-containing waste, between about 20 and 70 wt.% of Portland cement, and between about 35 and 85 wt.% of sand, (2) sufficient of one or more additive components selected from the group consisting of those manganese and alkaline earth metal compounds soluble in water at 25° C. to the extent of at least 100 grams per liter such that said one or more additive components are present in a total mole ratio to arsenic of between about 1 and 10, calculated as the total moles of alkaline earth and manganese metals in said one or more additive components to the total moles of arsenic in said arsenic-containing waste, and (3) sufficient water to dissolve said one or more additive components and produce a mixed material having the consistency of wet concrete, said landfill material being essentially completely impervious to the arsenic-leaching effects of ground or rain waters.

16. A landfill material as defined in claim 15 wherein said admixture comprises between about 2 and 15 wt.% of arsenic-containing waste, between about 30 and 60 wt.% of Portland cement, and between about 40 and 75 wt.% of sand.

17. A landfill material as defined in claim 15 wherein said additive components are selected from the group consisting of calcium chloride, magnesium chloride, manganese chloride, magnesium sulfate, and magnesium acetate.

* * * * *